United States Patent
Bennett et al.

(10) Patent No.: US 9,598,318 B1
(45) Date of Patent: Mar. 21, 2017

(54) CHROMIA REFRACTORY BRICK WITH CARBON TREATMENT

(71) Applicants: James P. Bennett, Salem, OR (US); Kyei-Sing Kwong, Albany, OR (US)

(72) Inventors: James P. Bennett, Salem, OR (US); Kyei-Sing Kwong, Albany, OR (US)

(73) Assignee: U.S. Department of Energy, Washington, DC (US)

( * ) Notice: Subject to any disclaimer, the term of this patent is extended or adjusted under 35 U.S.C. 154(b) by 158 days.

(21) Appl. No.: 14/483,187

(22) Filed: Sep. 11, 2014

Related U.S. Application Data

(63) Continuation-in-part of application No. 13/081,638, filed on Apr. 7, 2011, now abandoned.

(51) Int. Cl.
*C04B 35/42* (2006.01)
*C04B 35/12* (2006.01)
*C10J 3/02* (2006.01)

(52) U.S. Cl.
CPC .......... *C04B 35/12* (2013.01); *C10J 3/02* (2013.01); *C10J 2300/093* (2013.01); *C10J 2300/0943* (2013.01); *C10J 2300/0959* (2013.01); *C10J 2300/0973* (2013.01)

(58) Field of Classification Search
CPC .................................................. C04B 35/12
See application file for complete search history.

(56) References Cited

U.S. PATENT DOCUMENTS

| | | | |
|---|---|---|---|
| 3,436,237 A | 4/1969 | Crookston et al. | |
| 4,009,308 A | 2/1977 | Tadashi et al. | |
| 4,061,501 A | 12/1977 | Iversson et al. | |
| 4,210,454 A | 7/1980 | Rechter | |
| 4,327,185 A | 4/1982 | Bonsall | |
| 6,815,386 B1 * | 11/2004 | Kwong | C04B 35/12 501/103 |
| 8,481,152 B2 * | 7/2013 | Shuba | C04B 41/4539 428/305.5 |
| 8,609,563 B2 * | 12/2013 | Citti | C04B 35/12 501/103 |
| 8,658,552 B2 * | 2/2014 | Prior | C04B 35/013 501/126 |
| 2011/0152059 A1 | 6/2011 | Prior et al. | |

* cited by examiner

*Primary Examiner* — Karl Group
(74) *Attorney, Agent, or Firm* — Jacob A. Heafner; Michael J. Dobbs; Brian J. Lally

(57) ABSTRACT

The disclosure provides a refractory brick system comprising a chromia refractory brick for operation in the slagging environment of an air-cooled gasifier. The chromia refractory brick comprises a ceramically-bonded porous chromia refractory having a porosity greater than 9% and having carbon deposits residing within the pores. The brick may be further comprised of $Al_2O_3$. The air-cooled gasifier generates a liquefied slag in contact with the refractory brick and generally operates at temperatures between 1250° C. and 1575° C. and pressures between 300 psi to 1000 psi, with oxygen partial pressures generally between $10^{-4}$ and $10^{-10}$ atm. The refractory brick performs without substantial chromium carbide or chromium metal formation in the low oxygen partial pressure environment. The inclusion of carbon without chromium carbide formation provides for significant mitigation of slag penetration and significantly reduced refractory wear.

17 Claims, 3 Drawing Sheets

CHROMIA REFRACTORY BRICK WITH CARBON TREATMENT

RELATION TO OTHER APPLICATIONS

This patent application is a continuation-in-part of non-provisional application Ser. No. 13/081,638 filed Apr. 7, 2011, which claims priority from provisional patent application 61/321,550 filed Apr. 7, 2010, both of which are hereby incorporated by reference in their entirety.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

A chromia refractory brick comprised principally of $Cr_2O_3$, $Al_2O_3$, and carbon deposits within the pores principally for operation in the slagging environment of an gasifier generally operating at temperatures between 1250° C. and 1575° C., pressures between 300 psi to 1000 psi, and oxygen partial pressures between $10^{-4}$ and $10^{-10}$ atm. The refractory brick performs without substantial chromium carbide formation in the low oxygen partial pressure environment, providing for significant mitigation of slag penetration and significantly reduced refractory wear.

BACKGROUND

Gasification is a high temperature/pressure chemical process used to convert a carbon feedstock into CO and $H_2$ for use in power generation and the production of chemicals. It is also a leading candidate as a source of hydrogen in a hydrogen economy. Gasifiers, where the gasification reaction occurs, are processing vessels that contain the high temperature/pressure chemical reactions between a carbon feedstock (typically coal and/or petcoke), water, and oxygen (reducing); producing CO and $H_2$ gas (also called synthesis gas, or syngas). The gasification reaction occurs according to the following simplified reaction: $C+H_2O+O_2 \rightarrow H_2+CO+CO_2+H_2S$+minority gases+by products. Gasifiers are also being considered a critical component of advanced power generation technologies targeting near zero emissions; in part because gasification generates very low emissions, and because $CO_2$ generated by the gasification process can be easily captured for sequestration/reuse Several types of gasifiers are in commercial production, including dry ash and slagging variations. Slagging gasifiers generally operate at temperatures between 1250°-1575° C., at pressures between 300-1000 psi, and at oxygen partial pressures around $10^{-4}$ to $10^{-10}$ atm. Newly constructed gasification facilities may target production of up to 38,000 mtd of carbon feedstock, which is typically either coal and petroleum coke (also called petcoke), or combinations of them. Most impurities in coal and petcoke originate from mineral impurities, and range from about 1 wt % for petcoke to 10 wt % or higher for coal. The major impurities of concern in coal feedstock are oxides of Si, Fe, Ca, and Al; with additional oxide impurities of Ni and V in petcoke. During gasification, the impurities in the carbon feedstock liquefy, forming a slag which attacks the refractory liner currently used to protect the high pressure containment shell where gasification occurs, resulting in significant wear. Interactions between the slag and the refractory liner occur through the two major wear mechanisms of: 1) chemical dissolution and 2) spalling.

Structural spalling is caused by slag penetration into the porous refractory as it flows down the gasifier sidewall, and differences in physical properties between the penetrated and un-penetrated layers. Coal carbon feedstock rates of 2400 tons/day to a slagging gasifier create about 240 tons per day of slag waste, with the majority of the slag created flowing over the surface of a refractory. The mitigation of slag penetration into the refractory of air-cooled slagging gasifiers is a source of significant effort in order to reduce refractory wear and increase service life.

High chrome oxide materials have evolved as the best refractory linings in air cooled slagging gasifiers. The interaction between FeO in the slag and $Cr_2O_3$ in the refractory is highly beneficial in that it leads to a chemistry change in the slag, which increases the slag viscosity and limits its penetration into the refractory microstructure. See e.g. Chan et al., "Effect of $Cr_2O_3$ on Slag Resistance of $Al_2O_3$—$SiO_2$ Refractories", *J. Am. Ceram. Soc.* 75 (1992), among others. Identified high chrome oxide refractories include compositions comprised of $Cr_2O_3$—$Al_2O_3$, $Cr_2O_3$—$Al_2O_3$—$ZrO_2$, and $Cr_2O_3$—MgO; with the use of $Cr_2O_3$—MgO being limited or discontinued in the United States because of concerns over hexivalent chrome oxide. Generally, the refractories exhibit a microstructure having a high porosity (typically 10-20%). Porosity is an artifact of the controlled grain sizing used in making the refractory and of the sintering process, and helps to control thermal shock resistance. However, the porosity also allows slag to infiltrate the grains and grain boundaries, leading to slag/refractory interactions/corrosion, resulting in one of the primary failure modes of structural spalling.

It would be advantageous to provide a refractory brick for gasifier environments whereby a material could be used to fill refractory pores and mitigate the penetration of slag into the refractory. Such an improvements in the refractory microstructure would have a significant influence on wear caused by structural spalling. It would be additionally advantageous if the material were compatible with the high chromium content of refractory brick used in typical gasifiers, so that interactions between the material and the chromium leading to reductions in the chromium inventory could be avoided.

A technique to reduce wear that that has proven successful is the inclusion of carbon in the porous structure of a pre-fired refractory. Magnesia-carbon bricks are well-established refractory products in the steel industry. Similarly, refractory compositions of alumina, silicon, carbon, and chromic oxide are known. See U.S. Pat. No. 4,210,454 to Rechter, issued Jul. 1, 1980. The alumina-carbon-chromic oxide refractory includes silicon to mitigate the oxidation of the carbon, and the compositions generally limit chromic oxide to about 15 wt % of the composition. For air cooled slagging gasifier applications, this limit on chromic oxide composition is significantly less than that desired for economic feasibility. Studies conducted to determine the stability of $Al_2O_3$-rich refractories show that the higher the $Cr_2O_3$ concentration, the lower the deterioration rate. See Rawers et al., "Characterizing coal-gasifier slag-refractory interactions", *Materials at High Temperatures*, 16 (4) (1999). Generally, for air-cooled slagging gasifier environments, 60-95 wt % chromium oxide is utilized in $Cr_2O_3$—$Al_2O_3$ refractories. However, the inclusion of carbon in pre-fired chromia refractories intended for low oxygen partial pressure environments ($10^{-4}$-$10^{-10}$ $P_{O2}$) has generally been avoided because, under the applicable temperature and oxygen partial pressure conditions, chromia ($Cr_2O_3$) and carbon are thermodynamically predicted to form chromium carbides. Formation of these chromium carbides would act to both reduce the overall chromia inventory as well as negatively impact the ceramic bonding between grains that exists in such a pre-fired structure, leading to significant compromise of the pre-fired brick's structural integrity and a significantly negative impact on the operating life of gasifer refractory linings constructed with such pre-fired chromia bricks. For this reason, carbon inclusion within the pores of pre-fired chromia bricks has been avoided.

There have been efforts to incorporate chromia and carbon in pressed, resin-based, carbon-bonded bricks. See e.g., U.S. Pat. No. 8,658,552 issued to Prior et al., issued Feb. 25, 2014. The '552 patent provides pressed bricks having compositions generally comprising chrome aluminum aggregate, chromic oxide, aluminum powder, 1-8 wt. % of a phenolic resin, and typically about 2 wt. % carbon black. The resulting refractory is a carbon-bonded refractory, and additional metals are typically added to the composition to serve as anti-oxidants in service and preserve the bonding. In testing, chromia reduction is noted and is generally attributed to the presence of the resin bond and the carbon black. The '552 patent acknowledges this loss of chromia but accepts it as a trade-off due to the reduced slag penetration noted.

It would be advantageous to provide a chromia refractory brick for gasifier operations able to utilize carbon for mitigation of slag penetration and compatible with the high chromium oxide requirements generally established for applications in the low oxygen partial pressure environment of the gasifier, where the carbon and chromia were established in a relationship that avoided significant chromia inventory reductions in service. It would be further advantageous to provide a refractory brick which is not reliant on additional components such as silicon for mitigation of carbon oxidation, or other additives that would negatively impact the refractory service life performance.

Provided herein is a chromia refractory brick comprising a porous refractory brick comprising at least 60 wt. % $Cr_2O_3$, the balance generally being composed primarily of up to 40 wt pct $Al_2O_3$ or other refractory oxides. The porous refractory has a grain structure where the grains are bound to one another grain by ceramic rather than carbon bonding, where the ceramic bond is a solid state solution having a composition $M_aO_b$ and a substantial absence of carbon. Typically, M comprises Cr, Al, or a combination. The ceramically-bonded porous refractory additionally has an interconnected porosity greater than about 9% and generally less than about 20%. Within this ceramically-bonded, porous structure, carbon deposits reside within the plurality of pores and is present from about 1 wt. % to less than about 10 wt. % of the chromia refractory brick. The porous refractory may be formed by pre-firing a mixture of aggregate and fine powders such as $Cr_2O_3$, $Al_2O_3$, FeO, $TiO_2$, MgO, or other oxides at temperatures generally exceeding 1300° C. to a glassy or solid state oxide bond between larger oxide particles through solid state diffusion, liquid coalescence, vapor transport, or other known transport material transport means. Following formation of the ceramically-bonded, porous refractory, the pores remaining pores are filled with a carbon generating material, such as pitch and tar, followed by coking. The disclosure thus provides a high chromia refractory brick for gasifier environments where slag penetration is mitigated through use of carbon arranged in a manner compatible with the high chromium content of the refractory brick, so that reductions in the chromium inventory or a significant decreases in material performance can be avoided.

These and other objects, aspects, and advantages of the present disclosure will become better understood with reference to the accompanying description and claims.

SUMMARY

The disclosure provides a refractory brick system comprising a chromia refractory brick, where the chromia refractory brick comprises a ceramically-bonded porous chromia refractory with carbon deposits residing within its pores. The porous chromia refractory has a porosity greater than about 9% and is comprised of at least 60 wt. % $Cr_2O_3$ and further comprised of $Al_2O_3$. The porous chromia refractory additionally comprises a plurality of grains, where each grain in the plurality of grains is bound to an adjacent grain by a ceramic bond. The ceramic bond is a solid state solution having a composition $M_AO_b$ and a substantial absence of carbon, where M comprises Cr, Al, or mixtures thereof. Typically the plurality of grains includes grains of $Cr_2O_3$ and grains of $Al_2O_3$. The porous chromia refractory has a porosity greater than about 9%. The carbon deposits residing within the pores comprises from about 1 wt. % to less than about 10 wt. % of the chromia refractory brick. In some embodiments, the refractory brick system further comprises a slag in contact with the chromia refractory brick, and further comprises a gaseous atmosphere having a partial pressure of oxygen between $10^{-4}$ and $10^{-10}$ atmospheres, temperature between about 1250° C. and 1800° C., and a total pressure greater than about 20 atmospheres. The chromia refractory brick may be further comprised of $ZrO_2$ or other minority oxides, and is primarily but not necessarily intended for operations in air-cooled gasifiers that generate a liquefied slag in contact with the refractory in a reduction zone, and generally operates at temperatures between 1250° C. and 1575° C., pressures between 300 psi (about 20 atm) to 1000 psi (about 68 atm), and oxygen partial pressures generally between $10^{-4}$ and $10^{-10}$ atm.

The refractory brick formulations perform without detectable chromium carbide formation or chromium metal formation in the low oxygen partial pressure environments over a variety of compositions, as demonstrated through rotary slag testing and subsequent XRD and SEM analysis. This surprising result allows the ceramically-bonded $Cr_2O_3$ porous brick having carbon within its pores to act as a component in an air-cooled slagging gasifier, where high chrome oxide content materials are advantageous. The inclusion of carbon without substantial chromium carbide or chromium metal formation provides for significant mitigation of slag penetration and significantly reduced refractory wear.

During gasifier operation, the refractory brick is in direct contact with some portion of the slag. The interaction between FeO in the slag and $Cr_2O_3$ in the refractory leads to a chemistry change in the slag, which increases the slag viscosity and decreases the rate of penetration into the refractory microstructure. It also interacts with the $Cr_2O_3$ to form a diffusion barrier to FeO limiting further FeO/$Cr_2O_3$ interactions. Additionally, carbon within the pores of the refractory brick further mitigates the slag penetration, while the ceramic bond of the refractory brick gives it physical strength and structural integrity if the carbon is oxidized or otherwise removed. In an embodiment, the refractory brick is comprised of at least 60 wt % $Cr_2O_3$.

Carbon is thermodynamically predicted to form unstable carbides with $Cr_2O_3$ during use at the high temperature, low oxygen partial pressure environment known to exist in slagging gasifiers. These predictions would indicate that carbon inclusion with $Cr_2O_3$ in gasifier refractories should be avoided, in order to avoid the resulting reduction in the $Cr_2O_3$ inventory. In contrast to the thermodynamic predictions, inventors have determined that carbon inclusion within the pores of the porous chromia refractory described herein is compatible in the typical gasifier environment without the formation of chromium carbides or reduction of the chromia to chromium metal, as indicated by rotary slag testing of a variety of compositions and verified with subsequent XRD and SEM analysis.

These results demonstrate the advantages the refractory brick system described herein, where the refractory brick system comprises the porous chromia refractory described and further comprises carbon deposits within the porosity. The rotary slag testing and subsequent analysis indicates the carbon imparts resistance to slag penetration in the pores of the refractory brick without reduction in the chromium inventory through the formation of chromium carbides, as would be predicted in gasifier environments, where temperatures typically range between 1250° C. and 1575° C. and oxygen partial pressures are typically between $10^{-4}$ and $10^{-10}$ atmospheres.

The novel process and principles of operation are further discussed in the following description.

DETAILED DESCRIPTION

Figure 1:
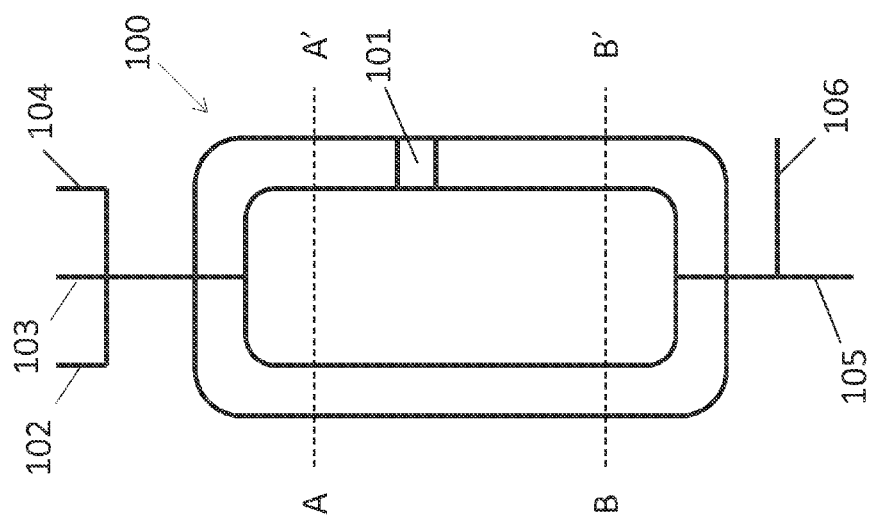
FIG. 1 illustrates an air-cooled slagging gasifier employing the refractory brick system in a reaction zone.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an air-cooled slagging gasifier utilizing a refractory comprised of $Cr_2O_3$ and carbon in contact with slag in a low oxygen partial pressure environment.

The disclosure provides a refractory brick system comprising a chromia refractory brick, where the chromia refractory brick comprises a porous chromia refractory with carbon deposits residing within its pores. The porous chromia refractory has a porosity greater than about 9% and is comprised of at least 60 wt. % $Cr_2O_3$ and further comprised of $Al_2O_3$. The porous chromia refractory additionally comprises a plurality of grains, where each grain in the plurality of grains is bound to an adjacent grain by a ceramic bond. The ceramic bond is a solid state solution having a composition $M_aO_b$ and having a substantial absence of carbon. Typically the plurality of grains comprises grains of $Cr_2O_3$ and $Al_2O_3$, and the ceramic bond comprises Cr, Al, or mixtures thereof, typically $Cr_2O_3$, $Al_2O_3$, mixtures thereof, and solid solution spinels. The carbon residing within the pores of the chromia refractory brick comprises from about 1 wt. % to less than about 10 wt. % of the chromia refractory brick. In some embodiments, the refractory brick system further comprises a slag in contact with the chromia refractory brick, and further comprises a gaseous atmosphere having a partial pressure of oxygen between $10^{-4}$ and $10^{-10}$ atmospheres, temperature between about 1250° C. and 1800° C., and a total pressure greater than about 20 atmospheres. The chromia refractory brick may be further comprised of $ZrO_2$ or other minority oxides, and is primarily but not necessarily intended for operations in air-cooled gasifiers that generate a liquefied slag in contact with the refractory in a reduction zone, and generally operates at temperatures between 1250° C. and 1575° C., pressures between 300 psi (about 20 atm) to 1000 psi (about 68 atm), and oxygen partial pressures generally between $10^{-4}$ and $10^{-10}$ atm.

Carbon is thermodynamically predicted to form unstable carbides with many materials during use at the high temperature, low oxygen partial pressure environment known to exist in slagging gasifiers. This indicates that carbon inclusion with $Cr_2O_3$ gasifier refractories should be avoided, in order to avoid the resulting reduction in the $Cr_2O_3$ inventory. However, inventors have surprisingly found that carbon inclusion within the pores of a porous chromia refractory as defined herein is compatible in the gasifier environment without the detectable formation of chromium carbides. The use of the ceramically-bonded chromia refractory brick in conjunction with carbon deposits within the pores allows the carbon to impart resistance to slag penetration in a manner that does not significantly reduce the chromium inventory through the formation of chromium carbides, as would be predicted in gasifier environments, and does not result in the reduction of chromia to chromium metal, as has been previously reported. Additionally, providing chromia and carbon in an arrangement avoiding significant reduction of the chromia inventory avoids negative impacts on the ceramic bonding between the grains of the chromia refractory brick supporting the carbon, maintaining structural integrity in service and prolonging operating life.

The refractory brick system performs without detectable chromium carbide formation in the low oxygen partial pressure environments over a variety of compositions, as demonstrated through rotary slag testing and subsequent XRD and SEM analysis. This surprising result allows the $Cr_2O_3$—$Al_2O_3$ porous brick having carbon within its pores to act as a component in an air-cooled entrained bed slagging gasifier, where high chrome oxide content materials are advantageous. The inclusion of carbon without detectable chromium carbide formation provides for significant mitigation of slag penetration and significantly reduced refractory wear. Within this disclosure, "detectable" as it relates to chromium carbides means chromium carbides not detectable by XRD or SEM analysis.

As discussed, the refractory brick system comprises a chromia refractory brick, where the chromia refractory brick is comprised of a porous chromia refractory having a plurality of pores, and further comprised of carbon deposits residing within some portion of the plurality of pores. The porous chromia refractory has a porosity of at least 9% in order to substantially ensure an interconnected porosity, and typically has a porosity less than about 20%. The carbon deposits residing within the plurality of pores comprises from about 1 wt. % to less than about 10 wt. % of the chromia refractory brick. In an embodiment, the carbon deposits comprise less than about 4 wt. % of the chromia refractory brick.

Here, "porous chromia refractory" means a refractory comprising at least 60 wt. % $Cr_2O_3$ and further comprising $Al_2O_3$. In an embodiment, the porous chromia refractory comprises less than 1 wt. % carbon, typically less than 0.1 wt. % carbon and more typically a substantial absence of carbon. The porous chromia refractory comprises a plurality of grains with a given individual grain bound to an adjacent grain by a ceramic bond having a composition $M_aO_b$, where $M_aO_b$ is a solid state solution and where M is a metal. In an embodiment, the plurality of grains comprises grains of $Cr_2O_3$, and each grain of $Cr_2O_3$ is bound to a second grain in the plurality of grains by a ceramic bond having a composition $M1_cO_d$, where M1 comprises Cr. In another embodiment, the plurality of grains comprises grains of $Al_2O_3$, and each grain of $Al_2O_3$ is bound to an adjacent grain in the plurality of grains by a ceramic bond having a composition $M2_eO_f$, where M2 comprises Al. Additionally, the ceramic bond between grains comprises less than 1 wt. % carbon, typically less than 0.1 wt. % carbon and more typically a substantial absence of carbon. Within this disclosure, "substantial absence of carbon" when invoked means carbon not detectable by XRD or SEM analysis. Additionally, the term "grain of $Cr_2O_3$" is not intended to imply that the associated grain consists only of $Cr_2O_3$, but rather that $Cr_2O_3$ comprises a majority wt. % of the associated grain. Similarly, the term "grain of $Al_2O_3$" is not intended to imply that the individual grain consists only of $Al_2O_3$, but rather that $Al_2O_3$ comprises a majority wt. % of the individual grain. Additionally it is understood that each subscript a, b, c, d, e, and f as used above may represent one or more real numbers.

In an embodiment, the grains in the plurality of grains have a mean grain diameter less than about 10 mm, where mean grain diameter is determined using the method of intercepts or some other means known in the art. Typically the grains generally have a mean grain diameter ranging from about 1 micron to about 3 millimeters. Here "grain" means a refractory grain as is typically understood in the art. See e.g., Al-Douri et al., "Solid state chemistry of alumina-chromia-magnesia and related refractories," *Journal of Materials Science Letters* 13 (1994) and associated references, among others. Further, in an embodiment, the porous chromia refractory and the plurality of grains has a volume of at least 100 $cm^3$, although it is understood that the porous chromia refractory and the plurality of grains as that term is used may have a volume significantly larger.

In an embodiment, the porous chromia refractory is further comprised of a binding oxide having a composition $M3_xO_y$, where M3 is a metal, and where M in the $M_aO_b$ solid state solution further comprises M3. The binding oxide may be FeO, $TiO_2$, $SiO_2$, MgO, $ZrO_2$, or other oxides. Each subscript x and y as used above represents one or more real numbers.

Additionally, "carbon deposit" means a mass comprised of at least 80 wt. %, preferably at least 90 wt. %, and more preferably at least 99 wt. % carbon.

The ceramic bond between grains comprising the porous chromia refractory can be formed by a number of techniques. In an embodiment, the ceramic bond is formed by mixing at least $Cr_2O_3$-containing and $Al_2O_3$-containing aggregate (typically sized from about 70 micron to about 3 millimeters) with a fine powder (typically sized less than 45 microns) of one or more oxides such as $Cr_2O_3$, $Al_2O_3$, FeO, $TiO_2$, $SiO_2$, MgO, or another oxide, and combining the resulting mixture with a binder followed by firing at a temperature generally greater than about 1300° C. Under firing, the materials form a glassy or solid state oxide bond by joining with the larger oxide particles through solid state diffusion, liquid coalescence, vapor transport, or other known transport material transport means. The introduction of carbon deposits into the resulting porous chromia refractory may be accomplished by any means known in the art. For example, the introduction of the carbon deposits may be conducted by: Preheating a porous chromia refractory to about 120-150° C.; Introducing the preheated porous chromia refractory into liquefied coal tar, petroleum pitch, and/or other carbon generating materials at a temperature typically about 120-150° C.; Leaving the porous chromia refractory in the carbon generating coal tar or petroleum pitch for several hours to allow the carbon generating material to impregnate the porous chromia refractory; Removing the impregnated chromia refractory from the solution and letting it cool, and; Coking the structure at a temperature of about 450-510° C. in a reducing environment (oxygen short) to drive off volatile hydrocarbons and break carbon chains, leaving behind a carbon structure in the refractory pores where the impregnation compound was originally placed.

Referring now to FIG. 1, FIG. 1 illustrates a slagging gasifier generally indicated at 100. Slagging gasifier 100 includes a fuel feed 102, a water feed 103, and a gas feed 104. Slagging gasifier 100 further includes a reaction zone between axis A-A' and B-B', and a refractory liner in the reaction zone and comprised of refractory brick, such as chromia refractory brick 101. The refractory liner is generally comprised of a plurality of chromia refractory bricks such as chromia refractory brick 101, and may extend throughout the gasifier.

As may be understood by those skilled in the art, and speaking generally, during operation a carbon feedstock such as coal, coke, char, or other carbonaceous fuel enters slagging gasifier 100 through fuel feed 102, while water generally in the form of steam enters through water feed 103, and a gas comprised of oxygen enters through gas feed 104. Typically the carbon feedstock is heated and undergoes a pyrolysis process on entering slagging gasifier 101, releasing volatile gases and producing a carbon feedstock such as char. As is understood, the pyrolysis process is dependent on the properties of the fuel material and determines the structure and composition of the carbon feedstock. The carbon feedstock, water, and oxygen comprising the gas subsequently mix and interact in the reaction zone. "Water" as the term is used here may refer to steam, liquid water, or various combinations thereof.

As is understood, the reaction zone is maintained at a temperature and pressure such that when the carbon feedstock, water, and oxygen mix in the reaction zone, a combustion and/or gasification process occurs as the volatile products and some of the carbon feedstock reacts with oxygen to primarily form carbon monoxide and some amount of carbon dioxide. Gasification subsequently occurs as the carbon feedstock reacts with carbon dioxide and steam to produce carbon monoxide and hydrogen. Additionally, the water gas shift reaction balances the concentrations of carbon monoxide, steam, carbon dioxide and hydrogen. The necessary heat for this process may be provided by an external source in an allothermal process, or the process may be autothermal, where heat is provided by the exothermal chemical reactions occurring inside the gasifier itself. The gasification process generally operates at temperatures between 1250° C. and 1575° C. and pressures between 300 psi to 1000 psi, with oxygen partial pressures generally between $10^{-4}$ and $10^{-10}$ atm within the reaction zone.

Slagging gasifier 101 typically operates such that the amount of oxygen available in the reaction zone is controlled, producing a syngas comprised of hydrogen and carbon monoxide, as well as other gaseous constituents depending gasifier conditions and the carbon feedstock. The gaseous products of the chemical reactions in the reaction zone exit slagging gasifier 101 at outlet 106. Minerals components in the carbon feedstock which do not gasify form a slag. The slag results from impurities in the carbon feedstock which liquefy during the gasification process. The slag generated in the reaction zone of slagging gasifier 101 is drawn by gravity toward slag tap 105 and during transit contacts the refractory liner under the pressure and temperature conditions of the reaction zone. As discussed supra, contact between the refractory and the slag leads to chemical dissolution and spalling, generating significant refractory wear.

It is understood that the previous description of slagging gasification and slagging gasifier 100 is general in nature, and that various configurations exist for gasification of a carbon feedstock under the principles described. For example, U.S. Pat. No. 4,340,397 to Schulz, U.S. Pat. No. 4,730,444 to Reichl, U.S. Pat. No. 4,195,978 to Anderson, U.S. Pat. No. 5,630,853 to Eales, U.S. Pat. No. 5,136,808 to Calderon, and U.S. Pat. No. 7,883,556 to Wintrell, among others. Within this disclosure, the means for introducing the carbon feedstock into the reaction zone may be any means sufficient to transport fuel to slagging gasifier 101 for subsequent pyrolysis to the carbon feedstock, such as high pressure injectors of fine particulate, or any other known system for the delivery of bulk material. The means for introduction of the gasifying medium comprised of water and oxygen may similarly be any mechanism or combinations sufficient for the delivery of water, steam, oxygen, air, or other gas comprised of oxygen, where the mechanism or combination exhibits sufficient control to establish and maintain partial oxidation in the reaction zone. For example, the means for introduction of the gasifying medium may be one or more fluid conduits having a flow throttling valve, where the flow throttling valve may be under automatic or manual control. The means for maintaining a temperature and a pressure in the reaction zone sufficient to generate the partial oxidation of the carbon feedstock may be the heat provided by the exothermal chemical reactions occurring inside the gasifier in an autothermal process, or may be an external powered source such as a heater or igniter in an allothermal process. Those skilled in the art understand that a gasification process in a reaction zone as described within this disclosure may utilize specific components over a wide variety of possible means.

The slag generated in the reaction zone of slagging gasifier 101 is drawn by gravity toward slag tap 105. The turbulent mixing within the reaction zone causes at least some portion of the refractory liner such as chromia refractory brick 101 to be in contact with the slag under the pressure and temperature conditions of the reaction zone. Generally speaking, with typical operation, the hot face of a refractory liner in a reaction zone such as that described herein is essentially coated with slag. In operations where the carbon feedstock is coal, coke, char, or other coal-derived fuel, the reaction zone typically operates at temperatures between 1250° C. and 1575° C. and pressures between 300 psi (about 20 atm) to 1000 psi (about 68 atm), with oxygen partial pressures generally between $10^{-4}$ and $10^{-10}$ atm. Under these conditions, the slag wears the refractory liner by chemical dissolution and spalling, leading to significant refractory wear. In coal-derived carbon feedstocks, the major impurities of concern are oxides of Si, Fe, Ca, and Al, with additional oxide impurities of Ni and V in petcoke.

At FIG. 1, chromia refractory brick 101 in direct contact with some portion of the slag is comprised of $Cr_2O_3$ and carbon. As is understood, the interaction between FeO in the slag and $Cr_2O_3$ in the refractory is beneficial in that leads to a chemistry change in the slag, which increases the slag viscosity and decreases the rate of penetration into the refractory microstructure. It also interacts with the $Cr_2O_3$ to form a diffusion barrier to FeO limiting further $Cr_2O_3$ interactions. However, slag penetration via a porous network would be expected to continue provided the open porous network remains. The novel chromia refractory brick of this disclosure mitigates or eliminates the penetration pathway enabled through a porous network by utilizing carbon deposits within the pores. The carbon deposits within the pores serves to limit the degree to which slag penetration may occur, and thereby limits the refractory surface available for the interaction. As previously discussed, the chromia refractory brick of this disclosure mitigates slag penetration through the use of carbon arranged in a manner compatible with the high chromium content of the porous chromia refractory, so that reductions in the chromium inventory or a significant decreases in material performance can be avoided.

As previously discussed, carbon is thermodynamically predicted to reduce the chromia inventory through the formation of chromium carbides under the high temperature, low oxygen partial pressure environment known to exist in slagging gasifiers. As an illustration, FIG. 2 demonstrates thermodynamically stable phases predicted on a mixture of $Cr_2O_3$ with carbon (C) and carbon monoxide CO over the temperature range and oxygen partial pressure ($10^{-6}$ to $10^{-10}$ atm) where gasification occurs. The interaction of $Cr_2O_3$, C, and CO would be expected to arise within the interior of a refractory comprising $Cr_2O_3$ and carbon, as the interior carbon within the refractory oxidizes to some degree under the low oxygen partial pressure conditions and establishes CO as the stable gas phase. At FIG. 2, the predicted results of this interaction are illustrated based on the relative mass of $Cr_2O_3$ and C present, expressed as $Cr_2O_3/(Cr_2O_3+C)$. As illustrated, chromium carbide formation is predicted to occur at all regions of FIG. 2. For example, at region I, $Cr_3C_2$, C and CO are predicted as the stable phases. At region II, $Cr_3C_2$, $Cr_4C$, and CO are predicted. At region III, $Cr_4C$, $Cr_2O_3$, and CO are predicted, and at region IV, $Cr_3C_2$, $Cr_2O_3$, and CO are predicted. These predictions may be generated from available analytical software packages, such as FACTSAGE. These predictions would indicate that carbon inclusion with $Cr_2O_3$ in gasifier refractories should be avoided, in order to avoid the resulting reduction in the $Cr_2O_3$ inventory and a loss of structural integrity within the ceramically-bonded chromia refractory brick. Inventors have surprisingly found—in contrast to the predictions of FIG. 2—that carbon inclusion within the pores of refractory brick comprised of $Cr_2O_3$ is compatible in the gasifier environment with no detectable formation of chromium carbides or chromium metal.

Figure 3:
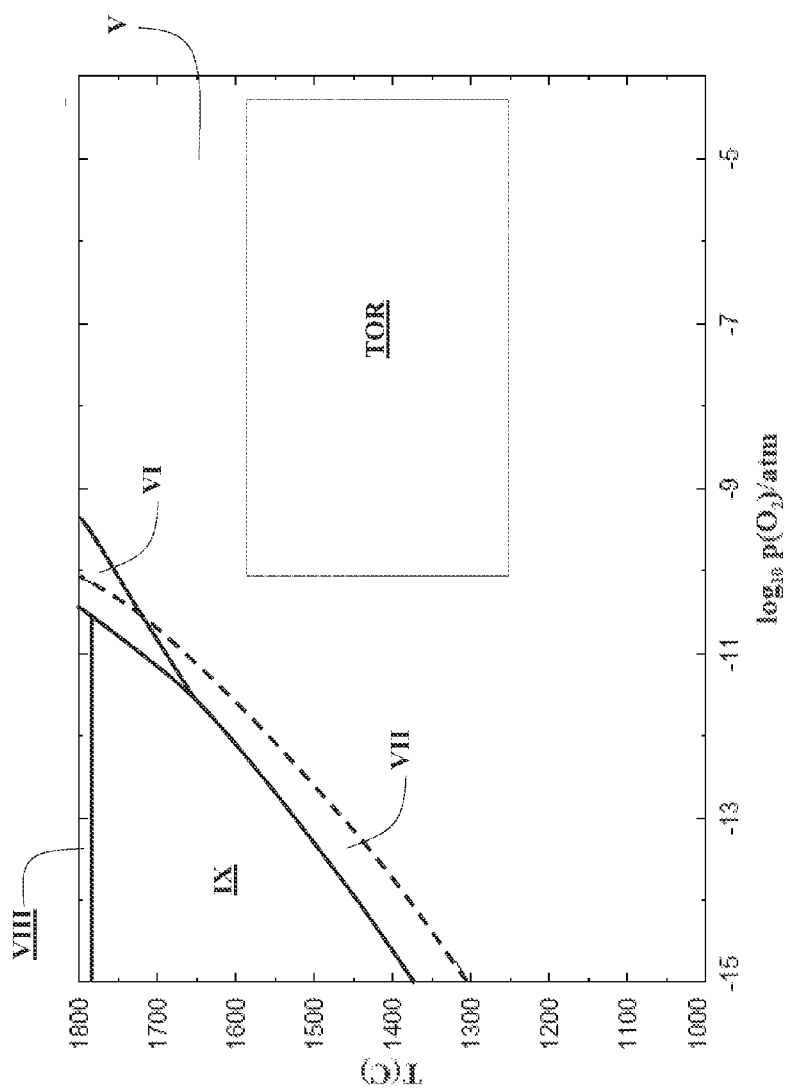
FIG. 3 illustrates the thermodynamic prediction for chromium metal formation at the surface of the chromia refractory brick under operating conditions and at temperature and pressure conditions expected in the typically exiting in the air-cooled slagging gasifier during operation.

Additionally, FIG. 3 demonstrates thermodynamically stable phases predicted on a mixture of $Cr_2O_3$ with carbon (C) and low levels of oxygen, where $Cr_2O_3/(Cr_2O_3+C)$ (g/g)=0.97. The presence of $Cr_2O_3$, C, and oxygen could be expected to arise generally at a surface (such as a hot face) of a refractory comprising $Cr_2O_3$ and carbon in an operating gasifier. FIG. 3 represents a typical operating region (TOR) between 1250 and 1575° C. and from about $10^{-10}$ atm $P_{O2}$ to about $10^{-4}$ atm $P_{O2}$. In regions V and VI, no chromium carbides or chromium metal are predicted as stable phases. In regions VII and VIII, $Cr_4C$ is predicted as a stable phase, and in region IX, $Cr_4C$ and chromium metal are predicted as stable phases. FIG. 3 demonstrates that a reduction to chromium metal on the hot face of the chromia refractory brick disclosed herein would not be thermodynamically expected within the typical operating region of 1250 and 1575° C. and from about $10^{-10}$ atm $P_{O2}$ to about $10^{-4}$ atm $P_{O2}$, and additionally would not be expected even for the broader temperature range of from about 1250° C. to about 1800° C. Additionally, due to limited diffusion of CO, only minor amounts of $Cr_4C$ would be expected in the regions designated. Similar analysis with $Cr_2O_3/(Cr_2O_3+C)$ (g/g) of 0.96 and below shows no formation of chromium metal over ranges of 1250° C. to about 1800° C. and $10^{-10}$ atm $P_{O2}$ to about $10^{-4}$ atm $P_{O2}$.

The disclosure thus provides a refractory brick system comprised of a chromia refractory brick, where the chromia refractory brick is comprises a porous chromia refractory having a plurality of pores and further comprises carbon deposits residing within the porosity, as discussed. In a particular embodiment, the refractory brick system is further comprised of a slag contacting the chromia refractory brick, where the slag comprises oxides of Si, Fe, Ca, Al, V, or mixtures thereof, and further comprises a gaseous atmosphere in contact with the slag, where the gaseous atmosphere has a partial pressure of oxygen less than about $10^{-4}$ atmospheres. In an additional embodiment, the gaseous atmosphere has a temperature greater than about 1250° C. and a total pressure greater than about 20 atmospheres, and in a further embodiment the partial pressure of oxygen of the gaseous atmosphere is greater than about $10^{-10}$ atmospheres and the temperature of the gaseous atmosphere is less than about 1800° C. Additionally disclosed is a method of using the refractory brick system comprising maintaining the chromia refractory brick in a refractory liner of a reaction zone of a slagging gasifier, maintaining a temperature in the reaction zone greater than about 1250° C. and maintaining a total pressure in the reaction zone greater than about 20 atmospheres; introducing a carbon feedstock, water, and oxygen into the reaction zone, where the carbon feedstock comprises Si, Fe, Ca, Al, V, or mixtures thereof; gasifying the carbon feedstock and generating gaseous products and a gasification slag, where the gaseous products comprise carbon monoxide and hydrogen and where the gaseous products have the partial pressure of oxygen less than about $10^{-6}$ atmospheres, and where the gasification slag comprises the oxides of Si, Fe, Ca, Al, V, or mixtures thereof; Contacting some portion of the gasification slag and the chromia refractory brick, thereby generating the slag contacting the chromia refractory brick, where the slag comprises Si, Fe, Ca, Al, V, or mixtures thereof and; Contacting some portion of the gaseous products and the some portion of the gasification slag contacting the chromia refractory brick, thereby generating the gaseous atmosphere in contact with the slag, where the gaseous atmosphere has the partial pressure of oxygen less than about $10^{-6}$ atmospheres, and thereby using the refractory brick system of claim 3. In a particular embodiment, the partial pressure of oxygen of the gaseous products is greater than about $10^{-10}$ atmospheres and the temperature in the reaction zone is less than about 1800° C., and in a further embodiment, the carbon feedstock is coal, petcoke, or combinations thereof.

Additional proof of concept and the advantages afforded over current approaches are further detailed below.

Demonstration and Description of a Preferred Embodiment

A rotary slag test was used to evaluate the molten slag wear resistance of samples of a chromia refractory brick comprised of approximately 90 wt % $Cr_2O_3$ and 9.3 wt % $Al_2O_3$, with a porosity of approximately 14.8%. Rotary slag testing was conducted on a chromia refractory brick having carbon deposits present in the pores, as well as on a porous chromia refractory having similar composition and without carbon present in the pores. The chromia refractory brick having carbon treatment was impregnated with petroleum pitch and coked commercially. The respective samples were tested using rotary slag testing as is known in the art. See e.g., Cobble et al., U.S. Bureau of Mines Report of Investigation, *A Laboratory Test to Evaluate the Resistance of Refractories to Molten Slags*, 8468 (1980); see also ASTM Standard C874, 2011, "Standard Practice for Rotary Slag Testing of Refractory Materials." The samples were cut into a #3 arch. The rotary slag test used 16-18 arch shaped refractory samples arranged in a circle. Sample testing was conducted at 1600° C. in a reducing (fuel rich) environment, exposing samples at the test temperature for 5 hours to a coal feedstock gasifier slag comprised of FeO, $Al_2O_3$, $SiO_2$, CaO, MgO, $Na_2O$, $K_2O$, $V_2O_3$, and NiO.

Following rotary testing, cross-sections of the respective samples were visually inspected and measured to determine the depth of slag penetration from the hot face into the sample, and the amount of material removed from the sample surface. The chromia refractory brick sample having the carbon deposits experienced less wear and less slag penetration than the porous chromia refractory sample with no pore carbon. From a starting sample height of 114.3 mm for both samples, the chromia refractory brick sample having carbon treatment experienced removal of 0.8 mm of surface, while the non-coked porous chromia refractory sample experienced 1.3 mm. Further, visual measurement of slag penetration indicated a penetration of 1.8 mm for the chromia refractory brick sample with carbon treatment, while the non-coked porous chromia refractory sample experienced a slag penetration of 4.3 mm.

Scanning Electron Microscopy (SEM) and elemental mapping for Ca, Si, and Cr phases was conducted in order to determine the penetration of slag into the two samples as indicated by the depth of Si and Ca movement from the hot face, where slag contacted the refractory samples. Based on this methodology, slag penetration in the chromia refractory brick sample having carbon treatment was not evident, while the non-coked porous chromia refractory sample experienced slag penetration less than about 5 mm, consistent with the visual inspection.

Figure 2:
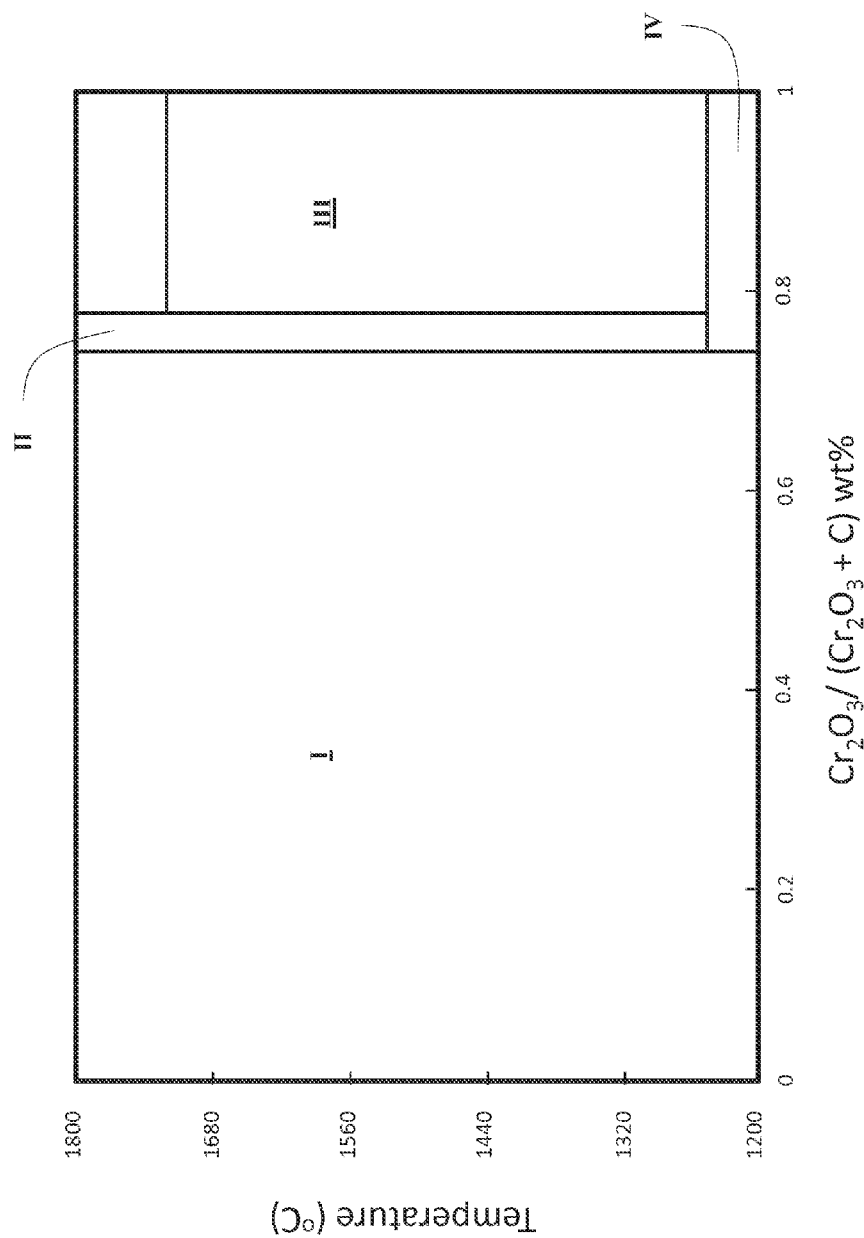
FIG. 2 illustrates the thermodynamic prediction for chromium carbide formation within the chromia refractory brick under operating conditions and at temperature and pressure conditions expected in the typically exiting in the air-cooled slagging gasifier during operation.

Further, XRD analysis of the two samples for crystalline phases present indicated no carbides of chrome or alumina present in the samples for either the chromia refractory brick having carbon treatment or the non-coked porous chromia refractory. The result is significant in terms of the chromia refractory brick sample having the carbon treatment, since thermodynamic modeling as illustrated at FIG. 2 indicates the formation of chromium carbides for a refractory brick comprised of $Cr_2O_3$ and having carbon within the pores of the refractory brick. As discussed supra, chromium carbide formation would be expected to reduce the $Cr_2O_3$ inventory within the chromia refractory brick and lead to degraded performance.

Additional rotary slag testing was conducted on chromia refractory brick and porous chromia refractory brick having the compositions indicated at Table 1, both with and without carbon present in the pores of the refractory. Refractory test brick indicated as having carbon treatment at Table 1 were impregnated with petroleum pitch and coked commercially. Remaining refractory test brick at Table 1 were tested as received. Following rotary slag testing, XRD analysis was conducted on samples from the slag/refractory interface to approximately 2 inches from the surface area in contact with the slag. Rotary slag testing was conducted at 1600° C. in a fuel rich (reducing environment), exposing samples at the test temperature for 5 hours to a coal feedstock gasifier slag comprised of FeO, $Al_2O_3$, $SiO_2$, CaO, MgO, $Na_2O$, $K_2O$, and other phases.

As indicated at Table 1, the samples analyzed using XRD for crystalline phases present indicated no carbides of chrome or alumina present in the samples for either the coked or as-received refractory brick. Again, the result is significant in terms of the commercially coked brick and contrary to the thermodynamic modeling as indicated at FIG. 2. Contrary to the expected production of chromium carbides in the coked refractory brick, the XRD analysis indicated crystalline phases of aluminum oxide, baddelyite ($ZrO_2$), bracewelite (CrO(OH)), chromium oxide, chromium alumina oxide, hercynite ($FeAlO_4$), iron chromite ($FeCr_2O_4$), and silicon oxide ($SiO_2$), without chromium carbide formation.

These results demonstrate the advantage of using a chromia refractory brick as described herein comprised of $Cr_2O_3$ and further comprised of carbon within the pores, in a slagging gasifier for a partial oxidation process using a carbon feedstock. The rotary slag testing and subsequent analysis indicates the carbon imparts resistance to slag in the pores of the refractory brick without reduction in the chromium inventory through the formation of chromium carbides, as would be predicted in gasifier environments, where temperatures typically range between 1250° C. and 1575° C. and oxygen partial pressures are typically between $10^{-4}$ and $10^{-10}$ atmospheres.

An exemplary fabrication for the chromia refractory brick utilized in this disclosure may occur through a process of pitch or coal tar impregnation and coking of a pre-fired porous chromia refractory shape. The process may be conducted by introducing a preheated porous chromia refractory (for example, preheated to 120-150° C.); into liquid coal tar, petroleum pitch, and/or carbon generating materials, depending on the impregnation material used and its temperature), leaving the porous chromia refractory in the preheated coal tar or petroleum pitch (typically between about 120-150° C.) for several hours, removing the porous chromia refractory and the impregnated carbon generating material from the solution and letting it cool down, then baking (coking) the structure to a minimum of 450-510° C. in a reducing environment (oxygen short) to drive off volatile hydrocarbons and break carbon chains, leaving behind a carbon structure in the refractory pores where the impregnation compound was originally placed. Expected carbon content is typically about 1 wt % of the finished product and may be as high as 4 wt %.

It is understood that the fabrication method discussed above is exemplary only and is not intended as limitations of this disclosure. Within this disclosure, it is only necessary that the chromia refractory brick be comprised of a porous chromia refractory and further comprised of carbon within at least a portion of the pores, as described. The disclosure is intended for gasifier environments experiencing temperatures typically ranging between 1250° C. and 1575° C. and oxygen partial pressures typically between $10^{-4}$ and $10^{-10}$ atmospheres. The refractory brick may be further comprised of additional elements, such as $ZrO_2$.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

XRD phases identified follow rotary slag testing

| Refractory Sample Composition | Carbon Treatment | A | Ba | Br | C | CAO | H | IC | S |
|---|---|---|---|---|---|---|---|---|---|
| 90 pct $Cr_2O_3$/10 $Al_2O_3$ | No | | | | x | | x | | |
| 90 pct $Cr_2O_3$/10 $Al_2O_3$ | Yes | | | | x | | x | | |
| 87 pct $Cr_2O_3$/3 $Al_2O_3$/ 6.5 $ZrO_2$ | No | | x | | x | | | | |
| 87 pct $Cr_2O_3$/3 $Al_2O_3$/ 6.5 $ZrO_2$ | Yes | | x | x | x | | | | |
| 20 pct $Cr_2O_3$/80 $Al_2O_3$ | No | x | | | x | x | | | |
| 20 pct $Cr_2O_3$/80 $Al_2O_3$ | Yes | x | | | x | x | x | | x |
| 10 pct $Cr_2O_3$/90 $Al_2O_3$ | No | x | x | | | x | | | |
| 10 pct $Cr_2O_3$/90 $Al_2O_3$ | Yes | x | x | | | x | | | |

Note 1:
A = Aluminum Oxide
Ba = Baddelyite ($ZrO_2$)
Br = Bracewelite [CrO(OH)]
C = Chromium Oxide
CAO = Chromium Alumina Oxide
H = Hercynite ($FeAlO_4$)
IC = Iron Chromite ($FeCr_2O_4$)
S = Silicon Oxide ($SiO_2$)

What is claimed is:

1. A refractory brick system comprising a chromia refractory brick, where the chromia refractory brick comprises:
    a porous chromia refractory, where the porous chromia refractory is comprised of at least 60 wt. % $Cr_2O_3$ and further comprised of $Al_2O_3$, and where the porous chromia refractory comprises a plurality of grains, and where each grain in the plurality of grains is bound to another grain in the plurality of grains by a ceramic bond, where the ceramic bond is a solid state solution having a composition $M_aO_b$ where M is a metal, and where the porous chromia refractory comprises a plurality of pores and has a porosity, where the porosity is greater than about 9%;
    carbon deposits residing within some portion of the plurality of pores of the porous chromia refractory, where the carbon deposits comprise from about 1 wt. % to less than about 10 wt. % of the chromia refractory brick.

2. The refractory brick system of claim 1 where the plurality of grains has a volume of at least 100 cm$^3$.

3. The refractory brick system of claim 2 where the porosity of the porous chromia refractory is less than about 20%.

4. The refractory brick system of claim 3 where each grain in the plurality of grains has a mean grain diameter less than about 10 mm.

5. The refractory brick system of claim 4 where the carbon deposits residing within the some portion of the plurality of pores comprises less than about 4 wt. % of the chromia refractory brick.

6. The refractory brick system of claim 1 where the plurality of grains comprises grains of $Cr_2O_3$, and where each grain of $Cr_2O_3$ is bound to at least a second grain in the plurality of grains by the ceramic bond, where the ceramic bond bonding the each grain of $Cr_2O_3$ has a composition $M1_cO_d$, where M1 comprises Cr.

7. The refractory brick system of claim 6 where the ceramic bond has a substantial absence of carbon.

8. The refractory brick system of claim 7 where the plurality of grains comprises grains of $Al_2O_3$, and where each grain of $Al_2O_3$ is bound to at least one adjacent grain in the plurality of grains by the ceramic bond, where the ceramic bond bonding the each grain of $Al_2O_3$ has a composition $M2_eO_f$, where M2 comprises Al.

9. The refractory brick system of claim 6 further comprising a slag contacting the chromia refractory brick, where the slag comprises oxides of Si, Fe, Ca, Al, V, or mixtures thereof, and further comprising a gaseous atmosphere in contact with the slag, where the gaseous atmosphere has a partial pressure of oxygen less than about $10^{-4}$ atmospheres.

10. The refractory brick system of claim 9 where the gaseous atmosphere has a temperature greater than about 1250° C. and a total pressure greater than about 20 atmospheres.

11. The refractory brick system of claim 10 where the partial pressure of oxygen of the gaseous atmosphere is greater than about $10^{-10}$ atmospheres and the temperature of the gaseous atmosphere is less than about 1800° C.

12. A method of using the refractory brick system of claim 9 comprising:
  maintaining the chromia refractory brick in a refractory liner of a reaction zone of a slagging gasifier;
  maintaining a temperature in the reaction zone greater than about 1250° C. and maintaining a total pressure in the reaction zone greater than about 20 atmospheres;
  introducing a carbon feedstock, water, and oxygen into the reaction zone, where the carbon feedstock comprises Si, Fe, Ca, Al, V, or mixtures thereof;
  gasifying the carbon feedstock and generating gaseous products and a gasification slag, where the gaseous products comprise carbon monoxide and hydrogen and where the gaseous products have the partial pressure of oxygen less than about $10^{-6}$ atmospheres, and where the gasification slag comprises the oxides of Si, Fe, Ca, Al, V, or mixtures thereof;
  contacting some portion of the gasification slag and the chromia refractory brick, thereby generating the slag contacting the chromia refractory brick, where the slag comprises the oxides of Si, Fe, Ca, Al, V, or mixtures thereof; and
  contacting some portion of the gaseous products and the some portion of the gasification slag contacting the chromia refractory brick, thereby generating the gaseous atmosphere in contact with the slag, where the gaseous atmosphere has the partial pressure of oxygen less than about $10^{-6}$ atmosphere.

13. The method of claim 12 where the partial pressure of oxygen of the gaseous products is greater than about $10^{-10}$ atmospheres and the temperature in the reaction zone is less than about 1800° C.

14. The method of claim 13 where the carbon feedstock is coal, petcoke, or combinations thereof.

15. A refractory brick system comprising a chromia refractory brick, where the chromia refractory brick comprises:
  a porous chromia refractory, where the porous chromia refractory is comprised of at least 60 wt. % $Cr_2O_3$ and further comprised of $Al_2O_3$, and where the porous chromia refractory comprises a plurality of grains, and where each grain in the plurality of grains is bound to another grain in the plurality of grains by a ceramic bond, where the ceramic bond is a solid state solution having a composition $M_aO_b$ where M is a metal, and where the ceramic bond has a substantial absence of carbon, and where the plurality of grains comprises grains of $Cr_2O_3$ where each grain of $Cr_2O_3$ is bound to at least a second grain in the plurality of grains by the ceramic bond, where the ceramic bond bonding the each grain of $Cr_2O_3$ has a composition $M1_cO_d$ where M1 comprises Cr, and where the porous chromia refractory comprises a plurality of pores and has a porosity, where the porosity is greater than about 9% and less than about 20%;
  carbon deposits residing within some portion of the plurality of pores of the porous chromia refractory, where the carbon deposits comprise from about 1 wt. % to less than about 10 wt. % of the chromia refractory brick.

16. The refractory brick system of claim 15 where the plurality of grains has a volume of at least 100 cm$^3$, and where each grain in the plurality of grains has a mean grain diameter less than about 10 mm.

17. The refractory brick system of claim 15 further comprising a slag contacting the chromia refractory brick, where the slag comprises oxides of Si, Fe, Ca, Al, V, or mixtures thereof, and further comprising a gaseous atmosphere in contact with the slag, where the gaseous atmosphere has a partial pressure of oxygen greater than about $10^{-10}$ atmospheres less than about $10^{-4}$ atmospheres, where the gaseous atmosphere has a temperature greater than about 1250° C. and less than about 1800° C., and where the gaseous atmosphere has a total pressure greater than about 20 atmospheres.

* * * * *